(12) United States Patent
Sonoda et al.

(10) Patent No.: US 6,216,813 B1
(45) Date of Patent: *Apr. 17, 2001

(54) RACK-PINION TYPE POWER STEERING APPARATUS

(75) Inventors: Hirotetsu Sonoda; Seiichi Kojima; Tatsuya Fukushima, all of Higashimatsuyama (JP)

(73) Assignee: Bosch Braking Systems Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,326

(22) Filed: Jun. 10, 1997

(30) Foreign Application Priority Data

May 23, 1996 (JP) .................................................. 7-128146
May 27, 1996 (JP) .................................................. 7-131711

(51) Int. Cl.$^7$ ......................................................... B62D 5/06
(52) U.S. Cl. ................................................ 180/421; 180/441
(58) Field of Search ................................. 180/417, 421, 180/422, 423, 441; 91/375 A (56) References Cited

U.S. PATENT DOCUMENTS

| | | | |
|---|---|---|---|
| 3,762,240 | * 10/1973 | Adams | 74/498 |
| 4,573,496 | * 3/1986 | Richard | 137/625.21 |
| 4,621,703 | * 11/1986 | Breitweg | 180/143 |
| 4,738,154 | * 4/1988 | Hancock | 74/492 |
| 4,799,954 | 1/1989 | Tanaka et al. | 137/625.23 |
| 4,877,100 | * 10/1989 | Emori et al. | 180/43 |
| 5,253,729 | * 10/1993 | Suzuki | 180/142 |
| 5,478,059 | * 12/1995 | Toyoshi et al. | 267/273 |
| 5,511,630 | * 4/1996 | Kohata et al. | 180/142 |
| 5,517,899 | * 5/1996 | Bohner | 91/375 A |
| 5,845,736 | * 12/1998 | Bohner et al. | 180/403 |
| 6,021,685 | * 2/2000 | Sonoda et al. | 74/388 PS |

FOREIGN PATENT DOCUMENTS

| | | |
|---|---|---|
| 0 059 657 A1 | 9/1982 | (EP) . |
| 0 082 027 | 6/1983 | (EP) . |
| 2 528 786 | 12/1983 | (FR) . |
| 2306928 | * 5/1997 | (GB) . |
| 55-114763 | 8/1980 | (JP) . |
| 55-114764 | 8/1980 | (JP) . |
| 61-160362 | 7/1986 | (JP) . |
| 62-34582 | 7/1987 | (JP) . |

* cited by examiner

Primary Examiner—Lanna Mai
Assistant Examiner—Andrew J. Fischer
(74) Attorney, Agent, or Firm—Townsend and Townsend and Crew LLP; Kenneth R. Allen (57) ABSTRACT

A rack-pinion type power steering apparatus includes a cylindrical stub shaft, a torsion bar, a pinion shaft, a rotor, and a sleeve. The stub shaft rotates in a steering body upon a steering operation. The torsion bar has one end fixed at one end of the stub shaft and extends toward the other end of the stub shaft. The pinion shaft is pivotally connected to the other end of the torsion bar and has pinion teeth that mesh with a rack of a steering wheel. The rotor is arranged to cover the torsion bar from the stub shaft along an extending direction of the torsion bar. The sleeve has one end integrally connected to the pinion shaft, extends from the pinion shaft along the stub shaft, and is arranged around the rotor to constitute a rotary type channel selector valve between the rotor and the sleeve. At least two ends of an inner circumferential portion of the sleeve integrally connected to the pinion shaft have slidable contact surfaces that slidably support the rotor integrally connected to the stub shaft. A bearing is arranged at either one of the two ends of the sleeve.

14 Claims, 7 Drawing Sheets

RACK-PINION TYPE POWER STEERING APPARATUS

BACKGROUND OF THE INVENTION

The present invention relates to a rack-pinion type power steering apparatus and, more particularly, to a rack-pinion type power steering apparatus having a rotary type channel selector valve (rotary valve).

A rack-pinion type power steering apparatus is advantageous in that it is lightweight, has a comparatively simple arrangement, is excellent in steering performance, and requires a small space when being incorporated in a vehicle, and is accordingly among those which are often employed as a power steering apparatus. Although apparatuses having various structures are conventionally proposed as such a rack-pinion type power steering apparatus, they still have room for improvement in achieving downsizing and weight reduction of a vehicle and making the apparatus compact.

For example, each of Japanese Utility Model Laid-Open Nos. 55-114763 and 55-114764 discloses a structure in which a sleeve constituting the outer valve member of a rotary type channel selector valve is integrally connected to and formed on a pinion shaft having pinion teeth that mesh with the rack teeth of a rack in order to simplify the arrangement of the entire apparatus, reduce the number of constituent components, and further decrease the size of the entire apparatus and to simplify the working and assembly operations.

In the former conventional case, a pinion shaft integrally connected to a sleeve is axially supported by a steering body with rolling bearings, e.g., a ball bearing and a needle bearing, formed on the two end portions of the pinion shaft. The valve housing portion can be integrally formed with the steering body. A stub shaft having a rotor pivotally disposed on the inner circumferential portion of the sleeve is axially supported by a ball bearing held by a plug member disposed at the open end of the valve housing.

In the latter conventional case, the two end portions of the pinion teeth of the pinion shaft are axially supported by a steering body with rolling bearings, e.g., a ball bearing and a needle bearing. A stub shaft connected to a rotor is pivotally supported by a ball bearing held by a body portion (although this body portion is shown as an integral member in the drawings, it is divisionally formed in practice) which is integral with the steering body.

In a conventional rack-pinion type power steering apparatus, a pinion shaft and a sleeve constituting the outer valve member of a rotary type channel selector valve are integrally formed, as described above. However, the conventional apparatus with this structure has a problem in the structure wherein the stub shaft, having a rotor inserted in the sleeve and relatively, rotatably displaceable, is axially supported in the steering body. Therefore, the conventional apparatus is not sufficient in achieving a smooth valve action, and it is desired that any countermeasure be taken.

This problem will be described in more detail. In the conventional case described above, the stub shaft having the rotor is pivotally, axially supported through a plug member engaging with the steering body or a bearing, e.g., a ball bearing, directly held by the body, not through the axial support portion that axially supports the pinion shaft integrally formed with the sleeve on the steering body. In order to obtain a smooth valve action with this arrangement, very high axial support precision is required.

In practice, however, it is impossible to cope with this demand. More specifically, when this structure is employed, the bearing axially supporting the stub shaft must have a bearing gap smaller than the valve clearance and must maintain strict concentricity allowed as it is formed on a member separate from the sleeve. It is almost impossible to achieve this demand.

In particular, in the rotary type channel selector valve arranged between the sleeve and rotor described above, the rotor integrally connected to the stub shaft of the steering wheel and the sleeve integrally connected to the pinion shaft of the steering wheel must be combined such that they can concentrically, rotatably displace relative to each other and be disposed in the valve housing. This is because the oil pump serving as the fluid pressure generating source, the oil tank, the inlet port and the return port communicating with the left and right cylinder chambers constituting the power cylinder, and the channels serving as the right and left output ports are connected to each other by selectively connecting and disconnecting a plurality of channel grooves radially formed in the outer circumferential surface of the rotor and the inner circumferential surface of the sleeve to and from each other by relative rotational displacement between the rotor and sleeve, thereby selecting the channels of the fluid pressure circuit (hydraulic circuit).

In the conventional rack-pinion type power steering apparatus described above, when the sleeve is integrally connected to the pinion shaft, it is difficult to obtain a smooth rotational displacement between the sleeve and the rotor integrally connected to the stub shaft, and a smooth valve action is hindered accordingly. A countermeasure that can solve this problem is therefore sought for.

SUMMARY OF THE INVENTION

The present invention has been made in view of the above situation, and has as its object to provide a rack-pinion type power steering apparatus in which axial support structures for a pinion shaft integrally formed with the sleeve of a rotary type channel selector valve and for a stub shaft integrally having a rotor are improved, and the pinion shaft and the stub shaft are appropriately, coaxially supported to obtain relative rotational displacement, so that a smooth valve action can be obtained, thereby obtaining a smooth steering feeling.

In order to achieve the above object, according to the present invention, there is provided a rack-pinion type power steering apparatus comprising a cylindrical stub shaft which rotates in a steering body upon a steering operation, a torsion bar having one end fixed at one end of the stub shaft and extending toward the other end of the stub shaft, a pinion shaft pivotally connected to the other end of the torsion bar, that is, the pinion shaft can pivot relative to the end of the torsion bar fixed to the stub shaft, and having pinion teeth that mesh with a rack of a steering wheel, a rotor arranged to cover the torsion bar from the stub shaft along an extending direction of the torsion bar, and a sleeve having one end integrally connected to the pinion shaft, extending from the pinion shaft along the stub shaft, and arranged around the rotor to constitute a rotary type channel selector valve between the rotor and the sleeve, wherein at least two ends of an inner circumferential portion of the sleeve integrally connected to the pinion shaft have slidable contact surfaces that slidably support the rotor integrally connected to the stub shaft, and a bearing is arranged at one of the two ends of the sleeve.

DESCRIPTION OF THE PREFERRED EMBODIMENTS

Figure 1:
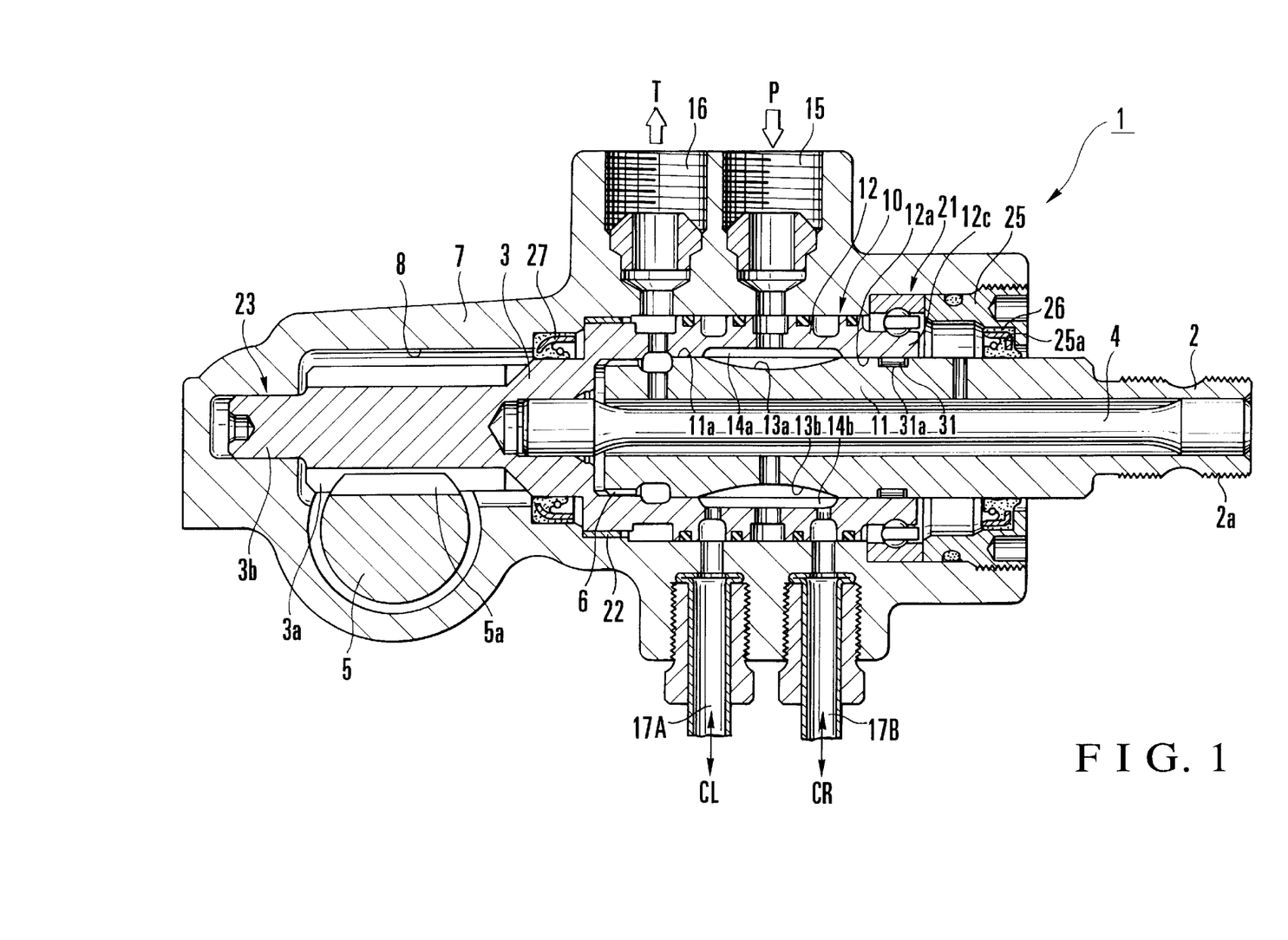
FIG. 1 is a sectional view of an apparatus main body portion showing a rack-pinion type power steering apparatus according to an embodiment of the present invention.

FIG. 1 shows a rack-pinion type power steering apparatus according to an embodiment of the present invention. In FIG. 1, reference numeral 1 denotes the power steering main body portion of the rack-pinion type power steering apparatus; 2, a cylindrical stub shaft serving as an input shaft connected to a steering wheel (not shown); 3, a pinion shaft; and 4, a torsion bar having one end fixed to one end of the stub shaft 2, extending toward the other end (to the left in FIG. 1) of the stub shaft 2, and connected to the pinion shaft 3 at its other end (inner end). A cylindrical rotor 11 is arranged to cover the torsion bar 4 along the extending direction of the torsion bar 4. Since it is integrally formed with the stub shaft 2, the rotor 11 is integrally connected to the stub shaft 2. A sleeve 12 is arranged around the rotor 11. The sleeve 12 has one end integrally formed with the pinion shaft 3 so that it is integrally connected to the pinion shaft 3. A rotary type channel selector valve 10 is formed between the rotor 11 and the sleeve 12. Pinion teeth 3a that mesh with rack teeth 5a on a rack 5 constituting a steering link mechanism (not shown) are formed on the pinion shaft 3.

Between the outer circumferential end of the rotor 11 away from the stub shaft 2 and the inner wall of the sleeve 12 near a portion integrally connected to the pinion shaft 3, a safety spline portion 6 constituted by projecting portions and groove portions is arranged as a fail safe mechanism that allows relative rotational displacement within a predetermined angular range caused by the torsion of the torsion bar 4.

The torsion bar 4 has the inner end pressed into and fixed with the pinion shaft 3 and an outer end extending through the stub shaft 2 to the outer end (right end) of the stub shaft 2. The stub shaft 2 is integrally connected to the torsion bar 4 at its serrated portion 2a to be coupled to the stub shaft 2 on the steering wheel side, through a welding means 2b by, e.g., welding the entire circumferential portion of the serrated portion 2a to the torsion bar 4. Conventionally, this portion is connected by driving a connection pin. In contrast to this, when connection is performed by welding the entire circumferential portion of the serrated portion 2a in this manner, hole formation and pin driving become unnecessary, and moreover an O-ring serving as a seal member also becomes unnecessary.

Reference numeral 7 denotes a steering body constituting the power steering main body portion. The steering body 7 serves also as a valve housing for the rotary type channel selector valve 10 (to be described later). The stub shaft 2 and the pinion shaft 3 are rotatably supported by axial support portions where they are directly received by bearings (to be described later) and the steering body 7. Oil seals are interposed at appropriate positions of the stub shaft 2 and the pinion shaft 3.

In this steering body 7, the inner end portions of the shafts 2 and 3 are integrally connected to the rotor 11 and the sleeve 12, respectively, constituting the rotary type channel selector valve 10. The rotor 11 and the sleeve 12 are combined such that they can rotatably displace relative to each other through the torsion bar 4, and are incorporated in an incorporating space 8 of the valve housing portion of the steering body 7. Channel selection between an oil pump P or an oil tank T (neither are shown) and right and left cylinder chambers CR and CL of the power cylinder is performed by relative rotational displacement of the rotor 11 and the sleeve 12, as is known widely.

The arrangement of the rotor 11 and the sleeve 12 constituting the rotary type channel selector valve 10, and the arrangement of the hydraulic circuit of the valve housing portion (body 7) are identical or similar to those widely known. A plurality of channel grooves are formed at predetermined intervals in the radial direction as valve grooves 13a and 13b and valve grooves 14a and 14b in outer and inner circumferential surfaces 11a and 12a, respectively, of the rotor 11 and the sleeve 12 that oppose and are in slidable contact with each other. A plurality of fluid supply holes and fluid discharge holes are formed in appropriate portions of the outer and inner circumferential surfaces 11a and 12a, respectively, of the rotor 11 and the sleeve 12 by boring. When these channel grooves and the like are selectively connected and disconnected, the hydraulic circuit is selectively controlled as required.

In FIG. 1, reference numeral 15 denotes an inlet port through which the hydraulic oil flows from the oil pump P; 16, a return port 16 through which the hydraulic oil returns to the oil tank T; and 17A and 17B, left and right output ports connected to the left and right cylinder chambers CL and CR, respectively, of the power cylinder. When the rotary type channel selector valve 10 (described above) rotationally displaces upon the steering operation, the hydraulic channels among these ports are arbitrarily connected and disconnected, thereby controlling generation of an auxiliary steering force in the power cylinder (not shown), as is known widely.

In this embodiment, the sleeve 12 constituting the rotary type channel selector valve 10 is integrally formed on the pinion shaft 3. The pinion shaft 3 is axially supported by the steering body 7 at the two end portions of the sleeve 12 through a ball bearing 21 serving as a rolling bearing and a bush 22.

According to this embodiment, a small-diameter distal end portion 3b of the pinion shaft 3 is axially supported by an axial support portion 23 which is a recess formed in the steering body 7. The bearing gap 23a between the axial support portion 23 and the pinion shaft 3 is within the allowable bending stress of the pinion shaft 3 and slightly larger than the bearing gap between the pinion shaft 3 and the axial support portions constituted by the ball bearing 21 and the bush 22 at the two end portions of the sleeve 12.

The ball bearing 21 described above has an inner ring constituted by a small-diameter portion 12c formed at the end portion of the sleeve 12 integral with the pinion shaft 3, and is constituted by a combination of a ball and an outer ring. In FIG. 1, reference numeral 25 denotes a plug member incorporated in the steering body 7 to engage with the open end of the incorporating space 8. The inner end of the plug member 25 abuts against the outer ring of the ball bearing 21, so that it is locked between the ball bearing 21 and the stepped portion of the steering body 7.

The plug member 25 is formed with an opening that holds the stub shaft 2 extending through the opening. A holding groove 25a for holding an oil seal 26 is formed in the plug member 25. The stub shaft 2 is pivotally inserted into the steering body 7 through the oil seal 26, and is sealed by the oil seal 26. Another oil seal 27 is disposed also at a portion of the pinion shaft 3 nearer the pinion teeth 3a than the bush 22. A working fluid is filled between the oil seals 26 and 27. Since the bush 22 is arranged in this working fluid, it has excellent bearing performance and excellent durability.

With the arrangement described above, since the pinion shaft 3 is axially supported by the steering body 7 through the axial support portions (21, 22) at the two end portions of the sleeve 12 which pose the serious problem in the valve action, deformation of the sleeve 12 at these portions is small and the valve action is smooth, thereby obtaining a smooth steering feeling. In particular, even if a light load such as a bending force acts on the pinion shaft 3, no bending deformation occurs in the sleeve 12, and the valve action of the rotary type channel selector valve 10 for obtaining an auxiliary steering force can be performed smoothly.

With the arrangement described above, even if a large load acts on the pinion teeth 3a of the pinion shaft 3, an influence on the sleeve 12 can be reduced, and the valve action at the sleeve 12 can be performed smoothly regardless of whether the load acts on the pinion teeth 3a.

Since the sleeve 12 constituting the rotary type channel selector valve 10 is integrally connected to the pinion shaft 3, the number of constituent components is small, and the number of portions to be worked is small, so that working and assembly operations are facilitated and the structure of the apparatus becomes simple. With this arrangement, a backlash that poses a problem during operation does not occur between the pinion shaft 3 and the sleeve 12, and the rigidity becomes excellent. Furthermore, in the conventional general apparatus structure, the sleeve 12 is formed as a separate member and is connected to the pinion shaft 3. Then, the size of the sleeve 12 and the pinion shaft 3 as a whole increases in the radial direction due to the presence of a connecting portion. Since the valve housing portion is formed separately from the steering body 7, the number of components increases, and the working and assembly operations become cumbersome. However, with the arrangement described above, these problems do not occur.

In particular, since the incorporating space 8 in the steering body 7 where the pinion shaft 3 and the stub shaft 2 are incorporated can be formed to open only on the stub shaft 2 side and such that its diameter decreases stepwise toward its distal end, its inner diameter can be worked by one-directional boring. Also, the assembly operation can be performed easily by incorporating, mounting, and pressing the pinion shaft 3 and the stub shaft 2 from one direction. Therefore, automatic assembly is possible. More specifically, in this embodiment, the incorporating space 8 can be formed by boring the steering body 7 from one side, and the concentricity of the members incorporated in the incorporating space 8 can be maintained, facilitating the assembly.

In this embodiment, since the sleeve 12 is integrally formed on the pinion shaft 3 and the sleeve 12 is formed to have the same diameter as that of the large-diameter portion of the pinion shaft 3, the steering body 7 and the valve body can be integrally formed, and a reduction in size can be achieved. With this straight structure constituted by the pinion shaft 3 and the sleeve 12, the rotor 11 to be incorporated in this straight structure can be formed straight to have the same diameter as that of the stub shaft 2, thereby improving the workability of the stub shaft 2.

As described above, since the distal end portion 3b of the pinion shaft 3 is axially supported by the axial support portion 23 having a bearing gap slightly larger than that of the axial support portions (21, 22) described above, a large support strength can be maintained over the entire pinion shaft 3, and no problem occurs in the durability. In particular, in this arrangement, the pinion shaft 3 integrally formed with the sleeve 12 is supported at three apparent points, i.e., the two axial support portions (21, 22) at the two ends of the sleeve 12 and the axial support portion 23 of the distal end portion 3b of the pinion shaft 3. In practice, however, when, for example, the acting load is small, the pinion shaft 3 is supported at two points, i.e., at the two ends of the sleeve 12. Therefore, the valve action in travel particularly along an almost straight road can be performed smoothly.

Since the bearing gap of the axial support portion 23 at the distal end portion 3b of the pinion shaft 3 is large and the degree of freedom in elasticity at the pinion teeth 3a is large, when the pinion teeth 3a mesh with the rack teeth 5a, even if the gear working precision is poor, this poor working precision can be absorbed. Since the rack teeth 5a and the pinion teeth 3a can mesh smoothly, a smooth steering feeling can be obtained. Since the meshing gap occurring due to the gear precision is not backlash among the constituent components, knocking does not occur in steering and kicking back.

Since the axial support portion 23 at the distal end portion 3b of the pinion shaft 3 functions only when a large load acts, which does not much influence the steering feeling, even if the pinion shaft 3 is received not by a comparatively expensive needle bearing but directly by a bush or the steering body 7, the steering feeling does not suffer.

According to the present invention, the rotor 11 is fitted and inserted with the inner circumferential surface 12a of the sleeve 12 integral with the pinion shaft 3 described above to be integral with the stub shaft 2, so that it is directly, axially supported. A needle bearing 31 serving as a rolling bearing is interposed at the end portion, on the stub shaft 2 side along the axis of the valve grooves 13a and 13b, and the valve grooves 14a and 14b, of the outer circumferential surface 11a of the rotor 11 that serves as a slidable contact surface with respect to the sleeve 12. In this embodiment, this needle bearing 31 is disposed at a portion corresponding to the small-diameter portion 12c constituting the ball bearing 21. Reference numeral 31a denotes an annular groove formed in the rotor 11.

With this arrangement, the rotor 11 and the sleeve 12 can be pivotally supported by the steering body 7 while the concentricity between them is maintained. The valve action can be made smooth with the needle roller of the needle bearing 31 described above, thereby improving the steering feeling. These advantages are obvious from the following fact. Even if an external force acts on the pinion shaft 3 or the stub shaft 2, decentering does not occur at the rotary type channel selector valve 10 constituted by the rotor 11 and the sleeve 12 because of the presence of the needle bearing 31, and stable rotational displacement can be obtained. Since a bearing, e.g., a conventional ball bearing, is not used, high working precision is not required, working is facilitated, and the cost is low.

When these axial support structures for the rotor 11 and the sleeve 12 are to be employed, if the slidable contact surface of either the rotor 11 or sleeve 12 is subjected to friction decreasing treatment, the valve action can be made smooth more effectively. As such friction decreasing treatment, for example, manganese phosphate treatment, gas soft nitriding treatment, fluorocarbon polymer, such as is sold under the name TEFLON® by the E. I. du Pont de Nemours and Company dispersion type electroless nickel-phosphorus composite plating, molybdenum disulfide baking, fluorocarbon polymer, such as is sold under the name TEFLON® by the E. I. du Pont de Nemours and Company coating, and plasma chemical vapor deposition ("CVD"), ceramic-based hard film treatment are possible, and either one of them may be performed. After the friction decreasing treatment is performed, a treatment for improving the plateau rate of the slidable contact surfaces may be performed. As this post-treatment, inner-diameter roller burnishing, outer-diameter roller finishing, buffing, or the like is possible in accordance with the treatment described above.

In this embodiment, in the power steering main body portion 1 of the rack-pinion type power steering apparatus, the stub shaft 2 and the torsion bar 4 are connected to each other by welding, e.g., TIG welding, after valve centering is performed, as described above. Therefore, the following advantages are obtained. If a connecting pin is used, as in the conventional case, centering of the stub shaft 2 and the torsion bar 4 can be performed easily as compared to a case wherein a boring pin driving operation is performed, and the valve action becomes smoother. Conventionally, valve centering is performed after component assembly while introducing a hydraulic pressure. However, with the structure of this embodiment, valve centering is preferably performed with a pneumatic pressure. Then, the working fluid will not burn during welding, and a conventional oil extracting operation after centering becomes unnecessary. Since entire circumferential welding is performed, an O-ring becomes unnecessary, and the problem of torsion of the torsion bar 4 caused by the torsional force of the O-ring during centering, thus causing decentering, is eliminated.

Figure 2:
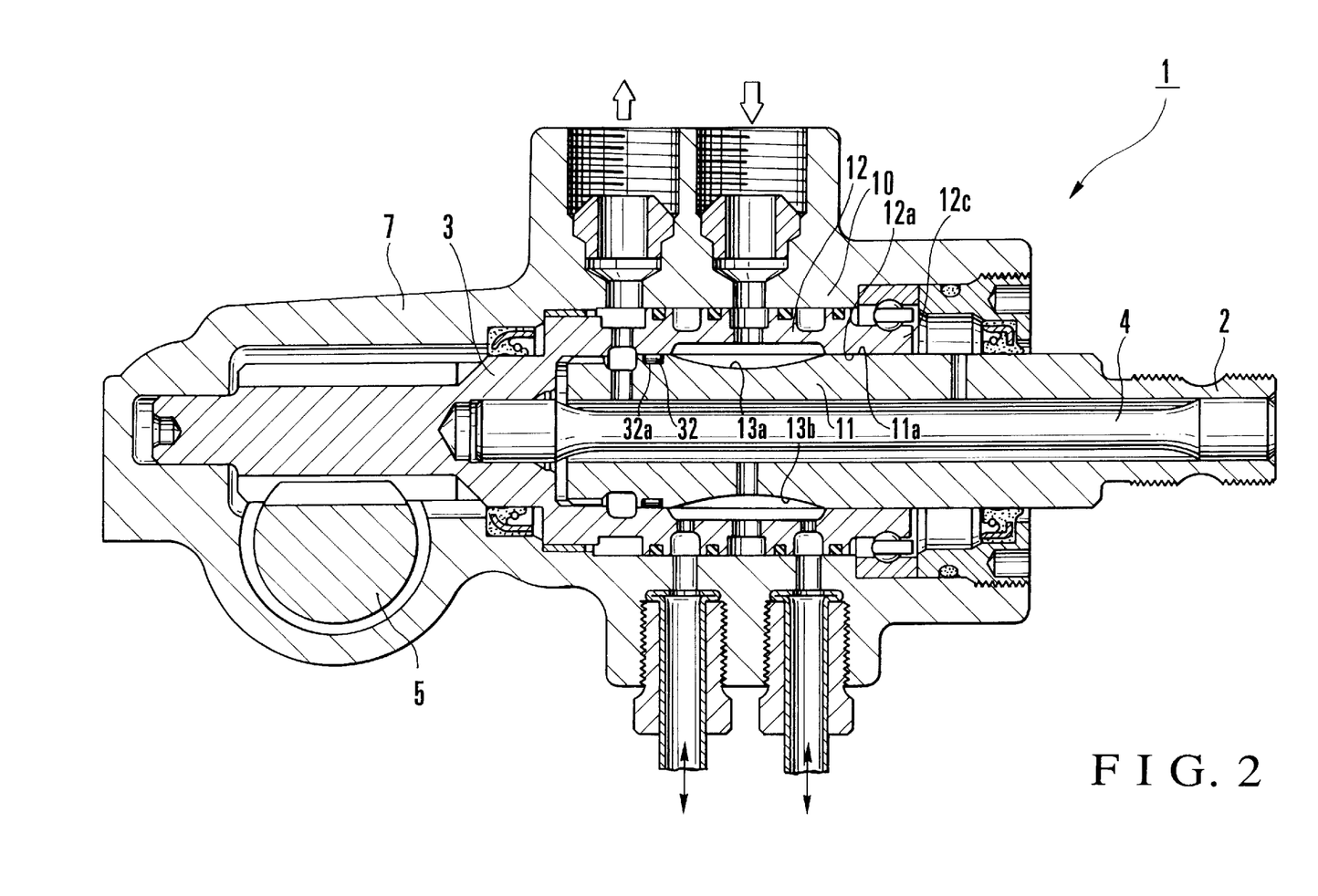
FIG. 2 is a sectional view of an apparatus main body portion showing a rack-pinion type power steering apparatus according to another embodiment of the present invention.
Figure 3:
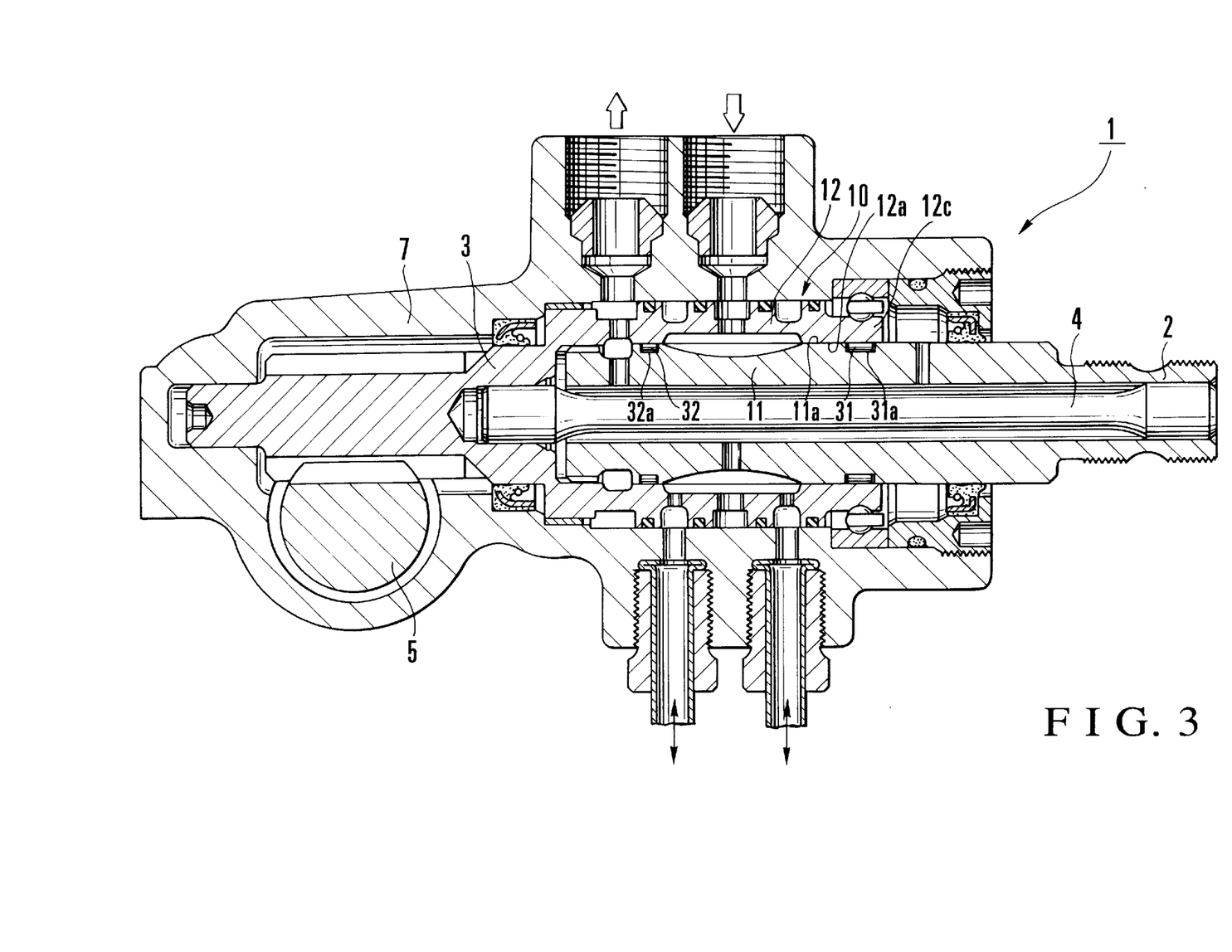
FIG. 3 is a sectional view of an apparatus main body portion showing a modification of the rack-pinion type power steering apparatus shown in FIGS. 1 and 2.

In the embodiment described above, in the rotary type channel selector valve 10 constituted by the rotor 11 and the sleeve 12, the groove 31a is formed in the end portion, on the stub shaft 2 side, of the valve grooves 13a and 13b of the outer circumferential surface 11a serving as the slidable contact surface of the rotor 11, and the needle bearing 31 is disposed at this portion. However, the present invention is not limited to this. For example, as shown in FIG. 2, opposite to the above description, a groove portion 32a may be formed at portions corresponding to the end portions of a sleeve 12 and a rotor 11 on the left side of valve grooves 13a and 13b, and a needle bearing 32 may be disposed at this portion. Alternatively, as shown in FIG. 3, needle bearings 31 and 32 may be disposed at portions corresponding to the two opposite end portions of each of a sleeve 12 and a rotor 11.

Figure 4:
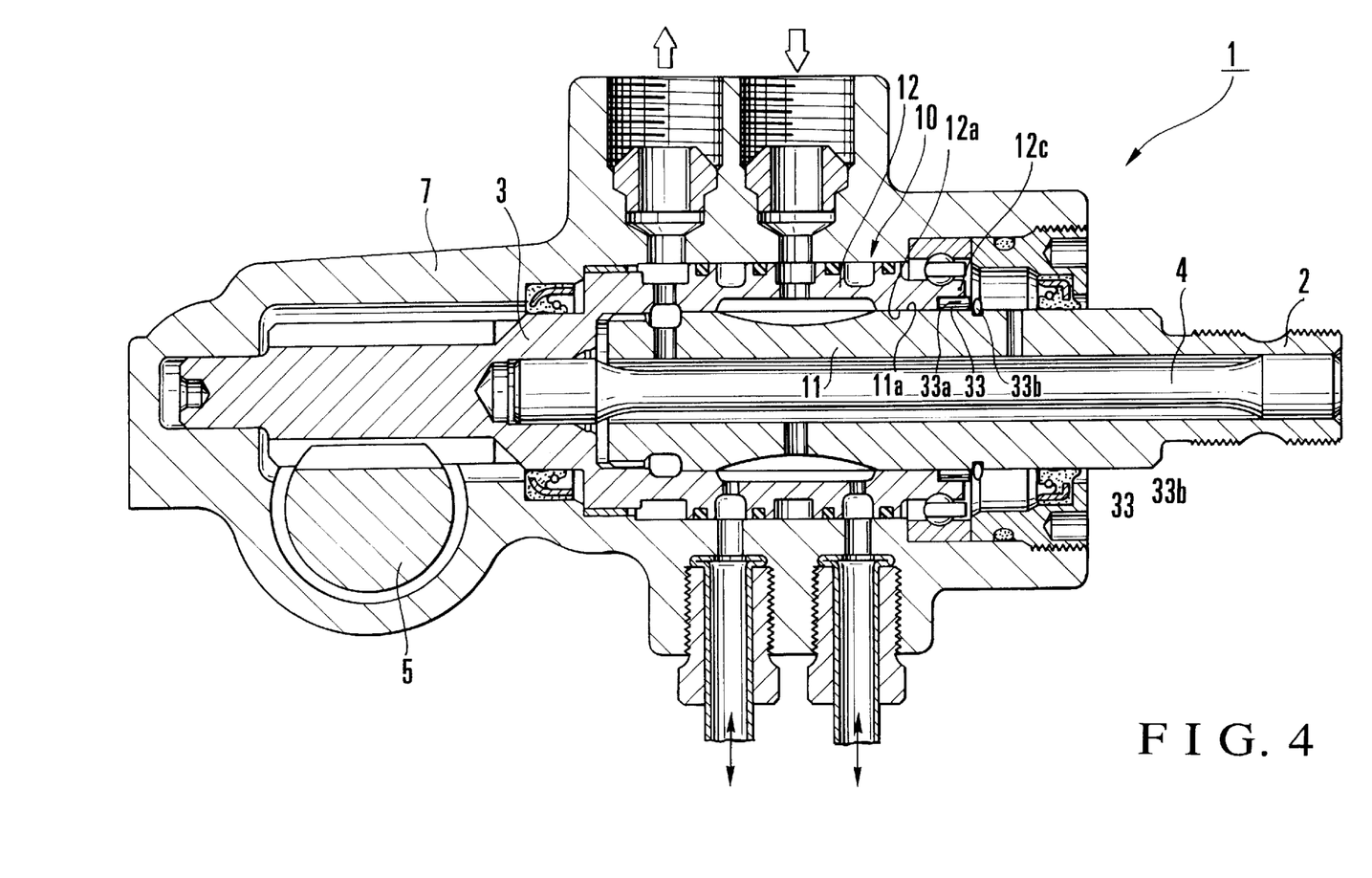
FIG. 4 is a sectional view of an apparatus main body portion showing a rack-pinion type power steering apparatus according to still another embodiment of the present invention.

Furthermore, as shown in FIG. 4, on an inner circumferential surface 12a of a sleeve 12, a groove portion 33a may be formed inside a small-diameter portion 12c constituting a ball bearing 21, and a needle bearing 33 may be disposed at this portion or at an opposite end portion (not shown). In the case shown in FIG. 4, the groove portion 33a may be formed to open in the end portion of the sleeve 12, and a locking ring, e.g., a snap ring 33b, may be mounted on the sleeve 12 or a stub shaft 2 through a plate to prevent the sleeve 12 from coming off.

Figure 5:
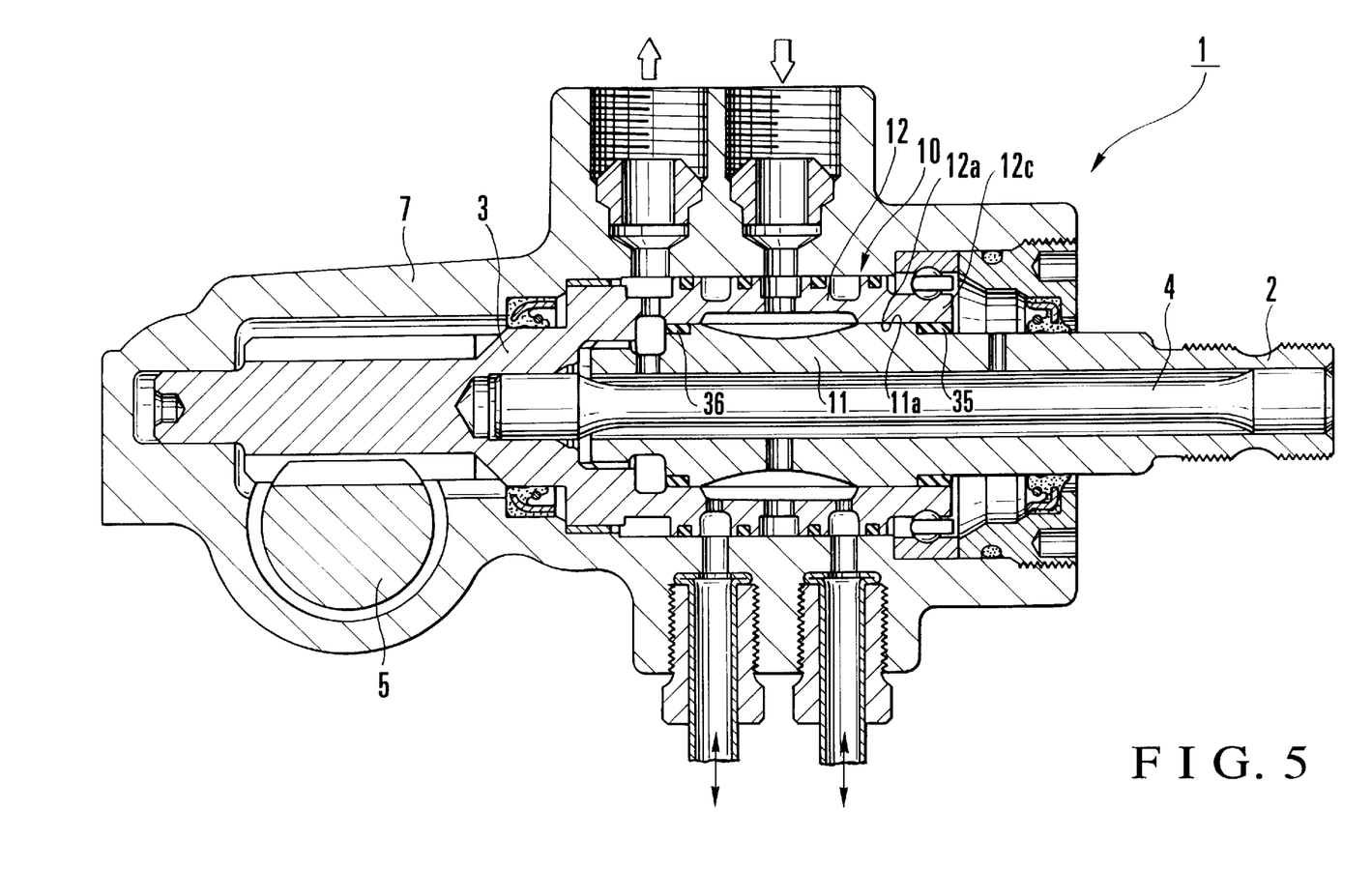
FIG. 5 is a sectional view of an apparatus main body portion showing a rack-pinion type power steering apparatus according to still another embodiment of the present invention.

In the embodiment described above, as the bearing disposed between the slidable contact surfaces of the rotor 11 and the sleeve 12, the needle bearing 31, 32, or 33 serving as a rolling bearing is disposed. However, the present invention is not limited to this. Bushes 35 and 36 serving as slide bearings may be disposed at the two end sides of the rotor 11 in the axial direction of valve grooves 13a and 13b, i.e., at the opposite end portions of portions corresponding to a sleeve 12 and the rotor 11, as shown in FIG. 5. When this arrangement is employed, after these bushes 35 and 36 are added, they may be finished while outer-diameter cutting of the rotor 11 is performed.

Figure 6:
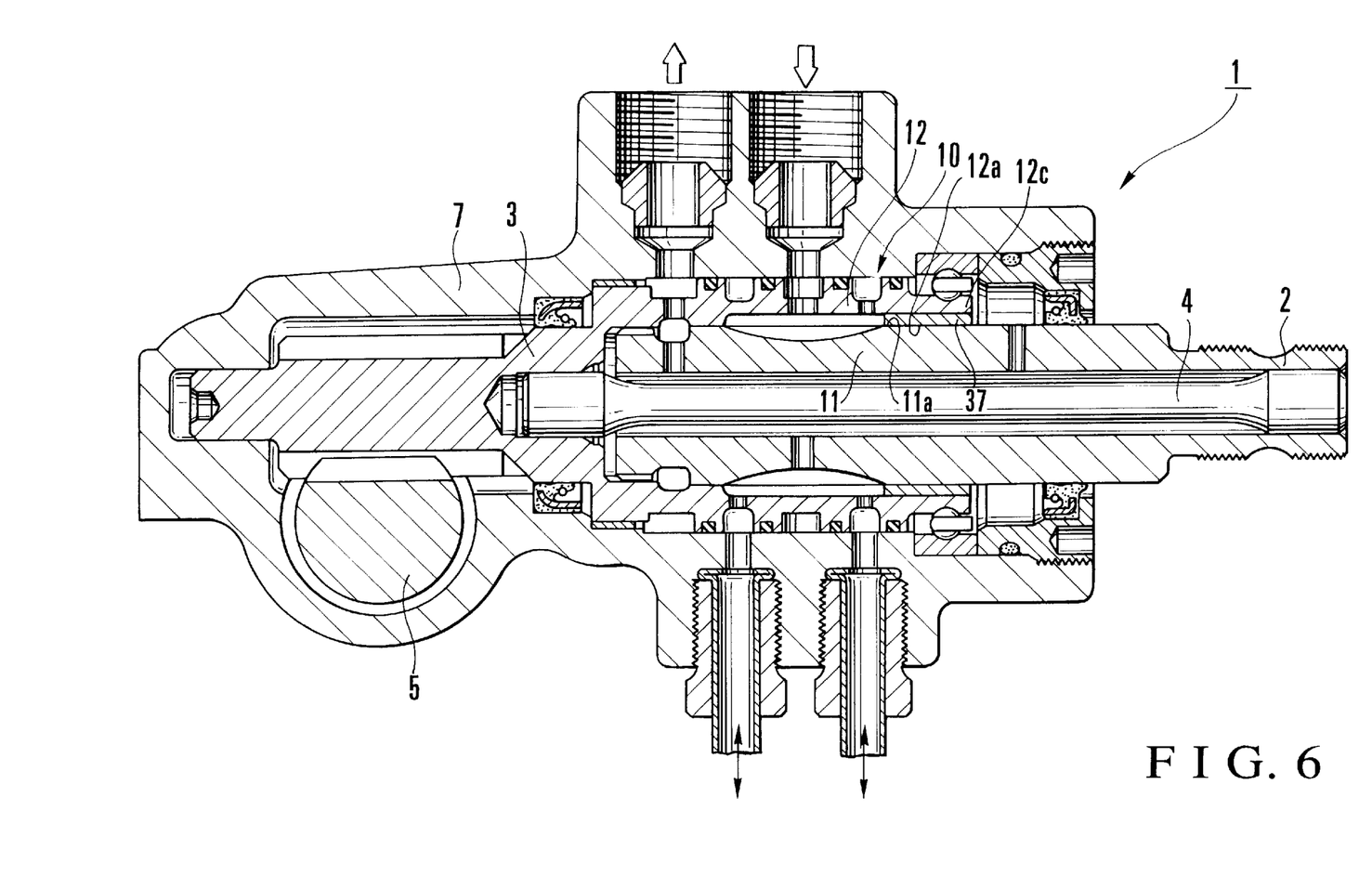
FIG. 6 is a sectional view of an apparatus main body portion showing a modification of the rack-pinion type power steering apparatus shown in FIG. 5.

FIG. 6 shows a case wherein a bush 37 is mounted on the inner circumferential portion of the end portion, on the stub shaft 2 side, of a sleeve 12. When the inner diameter of the sleeve 12 is subjected to cutting, this bush 37 can be finished simultaneously. As a modification of this, a groove for fitting the bush 37 therein may be worked simultaneously with valve grooves 14a and 14b, so that the bush 37 functions also as a stop-off ring that blocks the working fluid.

In the cases of FIGS. 6 and 5 described above, since finishing is performed simultaneously when inner-diameter finishing of the valve is performed, the number of working steps decreases, and high precision can be obtained.

The present invention is not limited to the structures described in the above embodiments, but the shape, structure, and the like of the respective portions of the power steering main body portion 1 of the rack-pinion type power steering apparatus can be modified and changed as required, as a matter of course. More specifically, in the embodiments described above, the rack-pinion type power steering apparatus is entirely examined, and the structure is simplified, the workability and the assembly are facilitated, and the cost is reduced. However, the present invention is not limited to this.

For example, the structure or the support structure of the stub shaft 2 and the rotor 11 constituting the rotary type channel selector valve 10, the shape and structure of the valve grooves and the fluid pressure channels of the rotary type channel selector valve 10 constituted by the rotor 11 and the sleeve 12, the rack 5, the support structure of the rack 5, and the like may be changed as required.

The ball bearing 21 using the sleeve 12 as the inner ring constitutes the axial support portion at the end portion of the sleeve 12 on the steering wheel side of the pinion shaft 3 shown in FIG. 1. However, the present invention is not limited to this, and a ball bearing whose inner ring is integrally fixed on the sleeve by a locking means, e.g., a snap ring, may be used. The axial support portion at the axial center 5 located on the sleeve 12 of the pinion shaft 3 on the pinion teeth 3a side is not limited to the bush 22, but may employ a bearing structure in which this axial center is directly received by a needle bearing or the steering body 7. The axial support portion 23 nearer the distal end portion 3b of the pinion shaft 3 than the pinion teeth 3a constitutes a bearing structure directly received by the body 7. However, this portion may constitute a bearing structure employing a bush or a needle bearing.

The distal end portion 3b located on the distal end side more than the pinion teeth 3a of the pinion shaft 3 of FIG. 1 may be formed with, e.g., a straight shape, a tapered shape in which the distal end is slightly so thin as to avoid striking of the distal end edge, or a curved shape in which the central portion is slightly thick.

Furthermore, the inner-diameter shape of the incorporating space 8 for the pinion shaft 3 of the steering body 7 and for the stub shaft 2 having the rotor 11 may be sequentially, monotonously enlarged toward the open end of the stub shaft 2, and the components to be incorporated in the incorporating space 8 may be incorporated through this opening. The plug member 25 which is fixed in this open end by screwing is formed with a holding groove for the oil seal 26 that seals the stub shaft 2, and another oil seal 27 is also held by the portion of the sleeve 12 nearer the pinion teeth 3a than the axial support portion on the pinion teeth 3a side.

Figure 7:
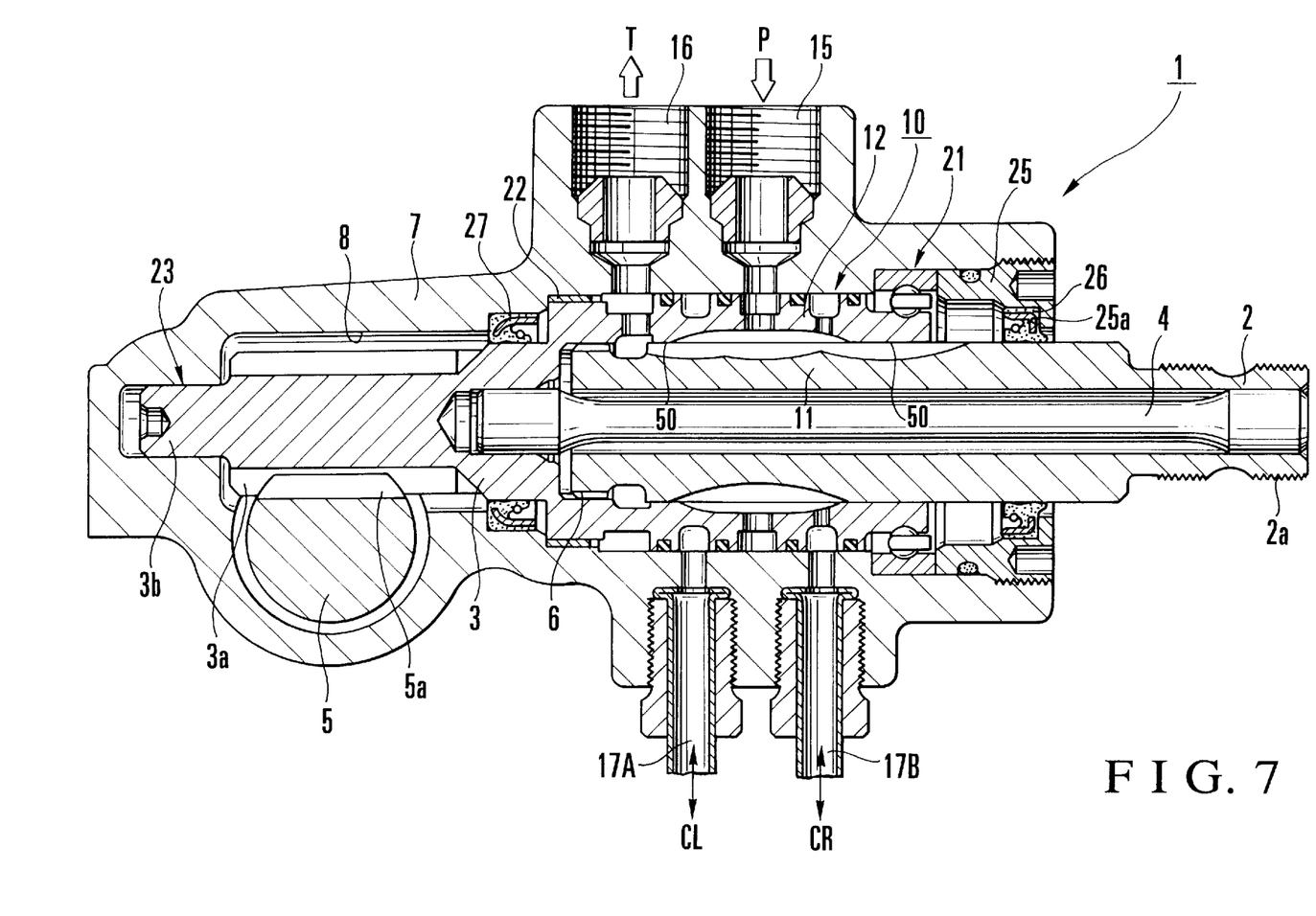
FIG. 7 is a sectional view of an apparatus main body portion showing a rack-pinion type power steering apparatus according to still another embodiment of the present invention.

FIG. 7 shows a rack-pinion type power steering apparatus according to still another embodiment of the present invention, in which the components identical to those in FIG. 1 are denoted by the same reference numerals. This embodiment is different from that in FIG. 1 in that the rolling bearing formed between one end of the sleeve 12 and the opposing rotor 11 in FIG. 1 is omitted in FIG. 7, and surfaces 50 that have undergone friction decreasing treatment are formed on the entire slide surfaces of a sleeve 12 and a rotor 11.

More specifically, in this embodiment, the slidable contact surface of either one or both of the rotor 11 and sleeve 12 is subjected to friction decreasing treatment. As such friction decreasing treatment, for example, either one of manganese phosphate treatment, gas soft nitriding treatment, fluorocarbon polymer, such as is sold under the name TEFLON® by the E. I. du Pont de Nemours and Company, dispersion type electroless nickel-phosphorus composite plating, molybdenum disulfide baking, fluorocarbon polymer, such as is sold under the name TEFLON® by the E. I. du Pont de Nemours and Company, coating, and plasma-CVD ceramic-based hard film treatment is possible. After the friction decreasing treatment is performed, a treatment for improving the plateau rate of the slidable contact surface may be performed. As this post-treatment, inner-diameter roller burnishing, outer-diameter roller finishing, buffing, or the like is possible in accordance with the treatment described above.

When this treatment is performed, the valve action becomes smooth, and the steering feeling can therefore be improved. In particular, these rotor 11 and sleeve 12 pivot relative to each other only through a small angle. If this surface treatment is performed, the cost is decreased when compared to a case wherein a separate bearing is arranged.

As has been described above, in the rack-pinion type power steering apparatus according to the present invention, the rotor integrally formed on the stub shaft is fitted and inserted with the inner circumferential portion of the sleeve integrally formed on the pinion shaft, so that the rotor is held pivotally. A bearing is disposed at a portion of the slidable contact surface of either the rotor and the sleeve, at least at one of the two end portions in the axial direction across the valve grooves formed in these rotor and sleeve. Therefore, despite the simple arrangement, excellent effects as follows can be obtained.

According to the present invention, since the sleeve integral with the pinion shaft axially supported by the steering body, and the rotor integral with the stub shaft fitted and inserted with the inner circumferential portion of the sleeve are directly, axially supported by a bearing which is formed at either one of the two ends in the axial direction of the valve grooves and which is interposed in part of the slidable contact surface of either one of the rotor and sleeve. Therefore, working precision at this axial support portion can be easily maintained, and the sleeve and the rotor can be axially supported to be pivotally displaceable relative to each other while the concentricity between them is maintained. With the rotary type channel selector valve having this structure, the valve action becomes smooth, so that the steering feeling can be improved.

According to the present invention, since a bearing, e.g., a conventional ball bearing, that requires high working precision is not used, the arrangement of the respective portions is simplified, thus decreasing the cost.

According to the present invention, if the rotor integrally formed on the stub shaft is directly, axially pivotally supported and at least a slidable contact surface of either one of the sleeve and the rotor is subjected to friction decreasing treatment, despite the simple arrangement, a larger friction than necessary between the sleeve and the rotor can be decreased, so that the valve action becomes smooth and the steering feeling can be improved.

What is claimed is:

1. A rack-pinion type power steering apparatus comprising:
   a cylindrical stub shaft which rotates in a steering body upon a steering operation;
   a torsion bar having a first torsion bar end fixed at a first end portion of said cylindrical stub shaft and extending away from the first end portion of said cylindrical stub shaft toward a second end portion of said cylindrical stub shaft;
   a pinion shaft pivotally connected to a second torsion bar end of said torsion bar and having pinion teeth that mesh with a rack of a steering wheel side;
   a rotor integrally connected to said second end portion of said cylindrical stub shaft and arranged to cover said torsion bar from said second end portion of said cylindrical stub shaft along an extending direction of said torsion bar, the rotor having an outer circumferential surface;
   a sleeve having a first end integrally connected to said pinion shaft, the sleeve extending from said pinion shaft toward said cylindrical stub shaft to a second end of the sleeve and having an inner circumferential surface, the sleeve being arranged around said rotor to constitute a rotary channel selector valve between said rotor and said sleeve,
   wherein an outer circumferential portion of said rotor has a first end portion and a second end portion, tho outer circumferential surface slidably in contact with the inner circumferential surface of said sleeve at said first end portion of said outer circumferential portion of said rotor to support said rotor, and
   wherein at least one of said inner circumferential surface of said sleeve and said outer circumferential surface of said rotor has undergone a friction decreasing treatment, wherein said friction decreasing treatment is one of a manganese phosphate treatment, a gas soft nitriding treatment, fluorocarbon polymer dispersion type electroless nickel-phosphorus composite plating, molybdenum disulfide baking, a fluorocarbon polymer coating, and a plasma-chemical vapor deposition ceramic-based hard film treatment; and
   a bearing supporting the sleeve against the rotor at said second end portion of said inner circumferential portion of said sleeve.

2. An apparatus according to claim 1, wherein said bearing is a rolling bearing or a slide bearing.

3. An apparatus according to claim 1, wherein said first end portion of said outer circumferential portion of said rotor is proximate to a pinion shaft.

4. An apparatus according to claim 1 further comprising a valve groove between said first end portion and said second end portion of said rotor.

5. An apparatus according to claim 1, wherein said friction decreasing treatment is one of a manganese phosphate treatment, a gas soft nitriding treatment, fluorocarbon polymer dispersion type electroless nickel-phosphorus composite plating, molybdenum disulfide baking, a fluorocarbon polymer coating, and a plasma-chemical vapor deposition ceramic-based hard film treatment.

6. A rack-pinion type power steering apparatus comprising:
   a cylindrical stub shaft which rotates in a steering body upon a steering operation;
   a torsion bar having a first torsion bar end portion fixed at a first end portion of said stub shaft and extending toward a second end portion of said stub shaft;
   a pinion shaft pivotally integrally connected to the second stub shaft end of said torsion bar and having pinion teeth that mesh with a rack of a steering wheel;
   a rotor integrally connected to said stub shaft and arranged to cover said torsion bar from said stub shaft along an extending direction of said torsion bar; and
   a sleeve having a first end integrally connected to said pinion shaft, the sleeve extending from said pinion toward said stub shaft to a second end of the sleeve, and arranged around said rotor to constitute a rotary channel selector valve between said rotor and said sleeve,
   wherein a first end portion of the outer circumferential surface of said rotor forms a first slidable contact with said sleeve and a second end portion of the outer circumferential surface of said rotor forms a second slidable contact with said sleeve, and
   wherein at least one of an inner circumferential surface of said sleeve and an outer circumferential surface of said rotor includes a surface having undergone a friction decreasing treatment at said first slidable and said second slidable contact, wherein said friction decreasing treatment is one of a manganese phosphate treatment, a gas soft nitriding treatment, fluorocarbon polymer dispersion type electroless nickel-phosphorus composite plating, molybdenum disulfide baking, a fluorocarbon polymer coating, and a plasma-chemical vapor deposition ceramic-based hard film treatment.

7. An apparatus according to claim 1 further comprising a ball bearing disposed between the steering body and the sleeve, wherein the ball bearing includes a small-diameter portion integrally formed on the sleeve and wherein an inner diameter shape of the steering body monotonously enlarges toward an open end of the steering body.

8. An apparatus according to claim 1 wherein the bearing is a bush having a surface formed co-extensively with either an inner circumferential surface of the sleeve or an outer circumferential surface of the rotor.

9. An apparatus according to claim 1, wherein the first end of the torsion bar is fixed to the stub shaft by a circumferential weld.

10. A rack-pinion type power steering apparatus comprising:
   a cylindrical stub shaft which rotates in a steering body upon a steering operation;
   a torsion bar having a first torsion bar end fixed at a first end portion of said cylindrical stub shaft and extending away from the first end portion of said cylindrical stub shaft toward a second end portion of said cylindrical stub shaft;
   a pinion shaft pivotally connected to a second torsion bar end of said torsion bar and having pinion teeth that mesh with a rack of a steering wheel side;
   a rotor integrally connected to said second end portion of said cylindrical stub shaft and arranged to cover said torsion bar from said second end portion of said cylindrical stub shaft along an extending direction of said torsion bar, the rotor having an outer circumferential surface;
   a sleeve having a first end integrally connected to said pinion shaft, the sleeve extending from said pinion shaft toward said cylindrical stub shaft to a second end of the sleeve and having an inner circumferential surface, the sleeve being arranged around said rotor to constitute a rotary channel selector valve between said rotor and said sleeve, wherein an inner circumferential portion of said sleeve has a first end portion and a second end portion, the inner circumferential surface slidably in contact with the outer circumferential surface at said first end portion of said inner circumferential portion of said sleeve to support said rotor, and a wherein at least one of the inner circumferential surface and the outer circumferential surface having undergone a friction decreasing treatment selected from the group consisting of a manganese phosphate treatment, a gas soft nitriding treatment, fluorocarbon polymer dispersion type electroless nickel-phosphorus composite plating, molybdenum disulfide baking, a fluorocarbon polymer coating, and a plasma-chemical vapor deposition ceramic-based hard film treatment; and
   a bearing supporting the sleeve against the rotor at said second end portion of said inner circumferential portion of said sleeve.

11. An apparatus according to claim 6 wherein said friction decreasing treatment is a manganese phosphate treatment, a gas soft nitriding treatment, fluorocarbon polymer dispersion type electroless nickel-phosphorus composite plating, molybdenum disulfide baking, a fluorocarbon polymer coating, or a plasma-chemical vapor deposition ceramic-based hard film treatment.

12. An apparatus according to claim 6 further comprising a valve groove disposed between said first end portion and said second end portion of said outer circumferential surface of said rotor.

13. A rack-pinion type power steering apparatus comprising:
   a cylindrical stub shaft which rotates in a steering body upon a steering operation;
   a torsion bar having a first torsion bar end fixed at a first end portion of said cylindrical stub shaft and extending away from the first end portion of said cylindrical stub shaft toward a second end portion of said cylindrical stub shaft;
   a pinion shaft pivotally connected to a second torsion bar end of said torsion bar and having pinion teeth that mesh with a rack of a steering wheel side;
   a rotor connected to said second end portion of said cylindrical stub shaft and arranged to cover said torsion bar from said second end portion of said cylindrical stub shaft along an extending direction of said torsion bar, the rotor having an outer circumferential surface;

a sleeve having a first end integrally connected to said pinion shaft, the sleeve extending from said pinion shaft toward said cylindrical stub shaft to a second end of the sleeve and having an inner circumferential surface, the sleeve being arranged around said rotor to constitute a rotary channel selector valve between said rotor and said sleeve, wherein an outer circumferential portion of said rotor has a first end portion and a second end portion separated by a valve groove, the inner circumferential surface slidably in contact with the outer circumferential surface at said first end portion of said rotor, and wherein at least one of the inner circumferential surface and the outer circumferential surface having undergone a friction decreasing treatment, wherein the friction decreasing treatment is a manganese phosphate treatment, a gas soft nitriding treatment, fluorocarbon polymer dispersion type electroless nickel-phosphorus composite plating, molybdenum disulfide baking, a fluorocarbon polymer coating, or a plasma chemical vapor deposition ceramic-based hard film treatment; and a bearing supporting the sleeve against the rotor at said second end portion of said inner circumferential portion of said sleeve.

14. An apparatus according to claim 6, wherein the first end of the torsion bar is fixed to the stub shaft by a circumferential weld.

* * * * *